(12) United States Patent
Li et al.

(10) Patent No.: US 7,599,097 B2
(45) Date of Patent: Oct. 6, 2009

(54) METHOD AND SYSTEM FOR DESIGNING MULTILEVEL HALFTONE SCREENS USING SPOT FUNCTIONS

(75) Inventors: Hong Li, Superior, CO (US); Mikel John Stanich, Longmont, CO (US); Gerhard R. Thompson, Wappingers Falls, NY (US); Chai Wah Wu, Poughquag, NY (US)

(73) Assignee: InfoPrint Solutions Company LLC, Boulder, CO (US)

( * ) Notice: Subject to any disclaimer, the term of this patent is extended or adjusted under 35 U.S.C. 154(b) by 722 days.

(21) Appl. No.: 11/149,235

(22) Filed: Jun. 10, 2005

(65) Prior Publication Data

US 2006/0279787 A1     Dec. 14, 2006

(51) Int. Cl.
*G06K 15/00*     (2006.01)
(52) U.S. Cl. .................. 358/3.06; 358/3.14; 358/3.03; 358/3.13
(58) Field of Classification Search .............. 358/3.06, 358/1.9, 3.05, 3.13, 3.26; 382/172, 173, 382/159, 181; 345/426
See application file for complete search history.

(56) References Cited

U.S. PATENT DOCUMENTS

| | | | |
|---|---|---|---|
| 5,291,311 A | 3/1994 | Miller | |
| 5,587,811 A * | 12/1996 | Liguori | 358/3.2 |
| 5,598,204 A * | 1/1997 | Harrington | 347/251 |
| 6,014,226 A | 1/2000 | Harrington et al. | |
| 6,020,908 A * | 2/2000 | Moledina | 347/246 |
| 6,123,733 A * | 9/2000 | Dalton | 703/5 |
| 6,714,212 B1 * | 3/2004 | Tsuboyama et al. | 345/696 |
| 6,714,318 B1 | 3/2004 | Morris, III et al. | |
| 6,757,078 B1 * | 6/2004 | Bai et al. | 358/1.9 |
| 2004/0190092 A1 * | 9/2004 | Silverbrook et al. | 358/539 |

* cited by examiner

*Primary Examiner*—Twyler L Haskins
*Assistant Examiner*—David L Suazo
(74) *Attorney, Agent, or Firm*—Blakely, Sokoloff, Taylor & Zafman LLP (57) ABSTRACT

A method and system for generating halftone tables, using a spot function, subdivides the pixels within the halftone cell of a halftone matrix into a plurality of sub-pixels, determines the value of the spot function corresponding to the position of each of the sub-pixels within the halftone matrix, repeats the subdividing and determining for all of the sub-pixels in the halftone matrix, ranks the values for the entire halftone matrix, normalizes the ranked values, generates a cumulative histogram based upon the normalized values, and stores the cumulative histogram as a halftone table.

20 Claims, 10 Drawing Sheets

METHOD AND SYSTEM FOR DESIGNING MULTILEVEL HALFTONE SCREENS USING SPOT FUNCTIONS

BACKGROUND OF THE INVENTION

1. Field of the Invention

The present invention generally relates to methods and systems for designing multilevel halftone screens. More particularly, the present invention relates to methods and systems for designing multilevel halftone screens using spot functions.

2. Description of the Related Art

Halftoning is the process of converting a continuous tone image to an image with reduced bit depth having the appearance of being a continuous tone image when viewed from a distance. This process is necessary to appropriately render images on printers or other display devices. The vast majority of printers in use today are binary printers. Many display devices are capable of displaying information using multiple intensity levels. Printers increasingly are being developed which have the ability to print more than two levels of intensity for a given ink or toner. These are known as multi-level printers. Additional printer levels can dramatically improve the quality of printed images.

There are many conventional ways in which one can take advantage of the ability to print multi-levels. However, many of these methods will not show satisfactory results on electrographic printers due to the complex toner and electrical charge considerations involved in the printing process of these devices. Therefore, in practice, the final result of conventional halftoning with multi-levels is often not significantly better on these types of printers when compared with binary printers.

SUMMARY OF THE INVENTION

In view of the foregoing and other exemplary problems, drawbacks, and disadvantages of the conventional methods and structures, an exemplary feature of the present invention is to provide a method and structure in which methods and systems for designing multilevel halftone screens use spot functions In a first exemplary aspect of the present invention, a method of generating halftone tables using a spot function includes subdividing at least one pixel within at least one halftone cell of a halftone matrix into a plurality of sub-pixels, determining the value of the spot function corresponding to the position of each sub-pixel of the plurality of sub-pixels within the halftone matrix, repeating the subdividing and determining the value of the spot function for all pixels within the halftone matrix, ranking the values of the spot function in order for the entire halftone matrix, normalizing the ranking number, generating a cumulative histogram and storing the cumulative histogram values.

In a second exemplary aspect of the present invention, a method for halftoning an image includes tiling an image using a halftone matrix, and determining an output value for each pixel of the image using a plurality of halftone tables that correspond to the pixel position within a halftone cell of the halftone matrix and the pixel value that is used to index the halftone table. At least one of the plurality of halftone tables is based upon values of a spot function applied to all sub-pixels of the halftone matrix.

In a third exemplary aspect of the present invention, a system for generating halftone tables using a spot function includes means for subdividing at least one pixel within at least one halftone cell of a halftone matrix into a plurality of sub-pixels, means for determining the value of the spot function corresponding to the position of all of the plurality of sub-pixels within the halftone matrix, means for ranking the spot function values for the entire halftone matrix, means for normalizing the ranked values, means for generating a cumulative histogram of the normalized ranked values, and means for storing the cumulative histogram.

In a fourth exemplary aspect of the present invention, a method for deploying computing infrastructure that includes integrating computer-readable code into a computing system. The computer-readable code includes instructions for subdividing at least one pixel within at least one halftone cell of a halftone matrix into a plurality of sub-pixels, instructions for determining the value of the spot function corresponding to the position of each sub-pixel of the plurality of sub-pixels within the halftone matrix, instructions for repeating the subdividing and determining the value of the spot function for all pixels within the halftone matrix, instructions for ranking the values of the spot function for the entire halftone matrix, instructions for normalizing the ranking number, instructions for generating a cumulative histogram, and instructions for storing the cumulative histogram.

In a fifth exemplary aspect of the present invention, a system for generating halftone tables using a spot function includes a sub-divider that subdivides at least one pixel within at least one halftone cell of a halftone matrix into a plurality of sub-pixels, a processor that determines the value of the spot function corresponding to the position of each the plurality of sub-pixels within the halftone cell, a ranking device that ranks the values of the spot functions for the entire halftone matrix, a normalizer that normalizes the ranked values, a generator for generating a cumulative histogram of the normalized ranked numbers, a storage for storing the cumulative histogram, and a quantizer that quantizes the output values of the table based on the printing multi-bit capability. The sub-divider and the processor sub-divide and process all pixels within the halftone matrix.

Conventionally halftoning has been performed using regularly spaced dots on a grid with these dots growing in size as the intensity of the input level increases. However, conventional methods have not been able to form symmetrically shaped and regularly spaced dots for bi-level printing for some screens because of quantization effects. Therefore, the quality of the images that are generated by these conventional methods suffer. In particular, these conventionally generated images include a certain amount of noise and lack of smoothness.

An exemplary embodiment of the present invention uses the multi-level capability of printers to give the appearance of each halftone dot being centered exactly on the coordinates of the halftone screen grid for the halftone dot. The growth of each dot is determined by an analog spot function. In this manner, the resulting halftone appears smooth and less noisy or grainy than has conventionally been obtainable.

In addition, the halftone images that are generated by an exemplary embodiment of the present invention are easily printed by electro-graphic printers because these printers employ the traditional dots-on-a-grid structure that has historically been used by these printers.

With an exemplary embodiment of the present invention, halftone screens of almost any frequency and angle are possible. Further, these halftone screens have uniformly shaped screen dots because an exemplary embodiment of the present invention eliminates the constraint that screen dot locations have to be located on the pixel locations defined by the printer grid.

With an exemplary embodiment of the present invention, the halftone screen dots can be located precisely on a halftone screen grid without quantization effects.

Increasing the number of exposure levels (bits/spot) reduces the amount of artifacts and improves the ability to form uniform screen dots.

Increasing the number of bits/spot also provides additional halftone gray levels which further improves smoothness and reduces noise.

With an exemplary embodiment of the present invention, screens of almost any screen frequency and angle are possible having uniformly shaped screen dots and the smoothness of the resulting output image is improved compared to the methods and systems that do not rely upon the present invention.

There are many multilevel printer technologies in existence and each technology has its own unique capabilities and restrictions. In general, the halftoning scheme that is used is dependent on the printer technology. Therefore, comparisons must be made between halftoning methods designed for the same printer technology. An exemplary embodiment of the present invention is intended for electro-graphic printers that require halftones using dot clusters having at least some level of contrast in comparison to the surroundings.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-13, there are shown exemplary embodiments of the method and structures of the present invention.

Conventionally many problems arise when generating a halftone mask to fill an image area. Conventional halftoning methods cannot consistently position the halftone dot centers relative to the printer pixels. Therefore, these conventional systems result in images that are more noisy and have a less smooth halftone appearance.

Figure 1:
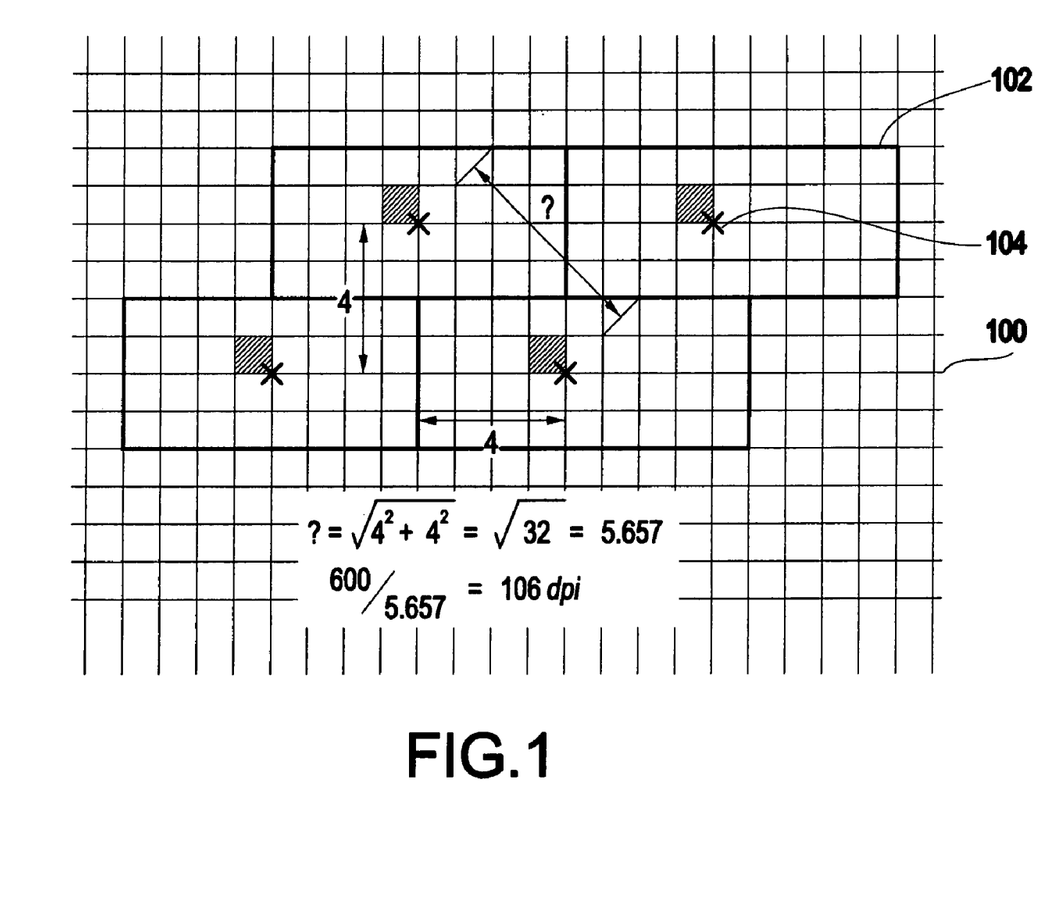
FIG. 1 illustrates an example of a conventional halftone mask to a printer grid.

For example, FIG. 1 illustrates an example of the application of a halftone cell 102 to a printer grid 100. The printer grid 100 has a 600 pixel per inch (ppi) resolution. The halftone cell 102 is a 4×8 pixel per halftone cell (not shown) and has a resolution of 106 dots per inch (dpi) at a screen angle of 45 degrees. The halftone cell 102 is tiled as alternating bricks.

FIG. 1 illustrates that the centers 104 for each halftone cell 102 have the same alignment with the pixel grid 100 for every dot. This configuration produces a very regular and uniform halftone image.

Figure 2:
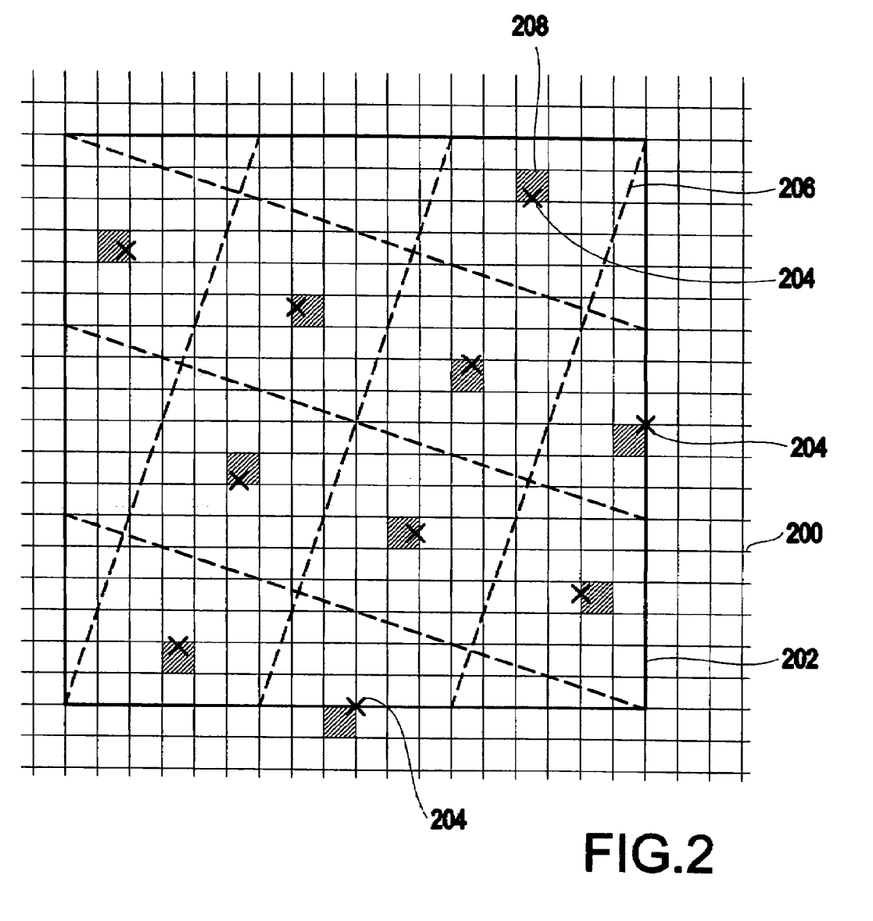
FIG. 2 illustrates an example of another conventional halftone mask to another printer grid.

However, some conventionally generated halftone cells are not regular and uniform. FIG. 2 illustrates a configuration that includes an 18×18 printer pixel halftone mask 202 (also known as a halftone super-cell, or halftone matrix) containing ten halftone cells 206. Each halftone cell 206 has a halftone cell center 204. For the purposes of the description of the exemplary embodiments of the present invention that follows, a halftone cell means an individual halftone cluster, and a halftone matrix or super-cell includes multiple halftone cells. The halftone super-cell 202 may be tiled on the image by repeating left to right and top to bottom in a square grid fashion (not shown). The tiling of these super-cells is repeated over the image for each row without any offset.

As is clearly illustrated by FIG. 2, the halftone cell centers 204 do not consistently overlay the same position on each of the underlying printer pixels 208 on the printer grid 200. As a result, an image that is processed using this configuration results in a halftone image that is noisy and not smooth.

Another problem is that in conventional bi-level halftoning a halftone cell is grown one pixel at a time. This conventional method introduces a non-symmetry around the cell center for many of the screen dots within the super-cell. The more the screen dots deviate from a symmetrical smooth shape, the lower the quality of the halftone image.

An exemplary embodiment of a halftoning method in accordance with the present invention uses a spot function to generate a set of halftone tables.

In one exemplary embodiment of the present invention each halftone table created corresponds to a pixel position in a halftone cell. The frequency and angle of the halftone cells within a halftone mask (also known as a halftone matrix, or halftone super-cell) are preferably designed and/or chosen to conform to the printer grid as close as possible to minimize the noise which has been described previously. Each halftone table includes values that correspond to each of a set of gray levels that are printable by a corresponding printer.

First, in accordance with conventional methods, the size of the halftone mask, the arrangement of halftone cells within the halftone mask is determined based upon the printer resolution, a desired halftone resolution and a desired halftone screen angle. For example, given a 600 ppi (pixel per inch) printer and a screen resolution of 106 dpi (dot per inch) at a screen angle of 45 degrees, a 4×8 mask with one halftone dot is tiled across the image. A four pixel offset is to create an alternating brick tiling over the image between adjacent rows.

Next, a spot function is selected. A spot function defines the halftone pattern. There are relatively simple spot functions that define common halftone patterns. A spot function is selected based on preferences and experience for quality halftone pattern on target printer. For example spot function which produces some ellipticity may be used to minimize tone jumps which occur when dots join by reducing the number of connecting points to adjacent dots. Furthermore spot functions which have symmetry between the shape of the halftone dot and hole (white space between dots) are frequently used.

Figure 3:
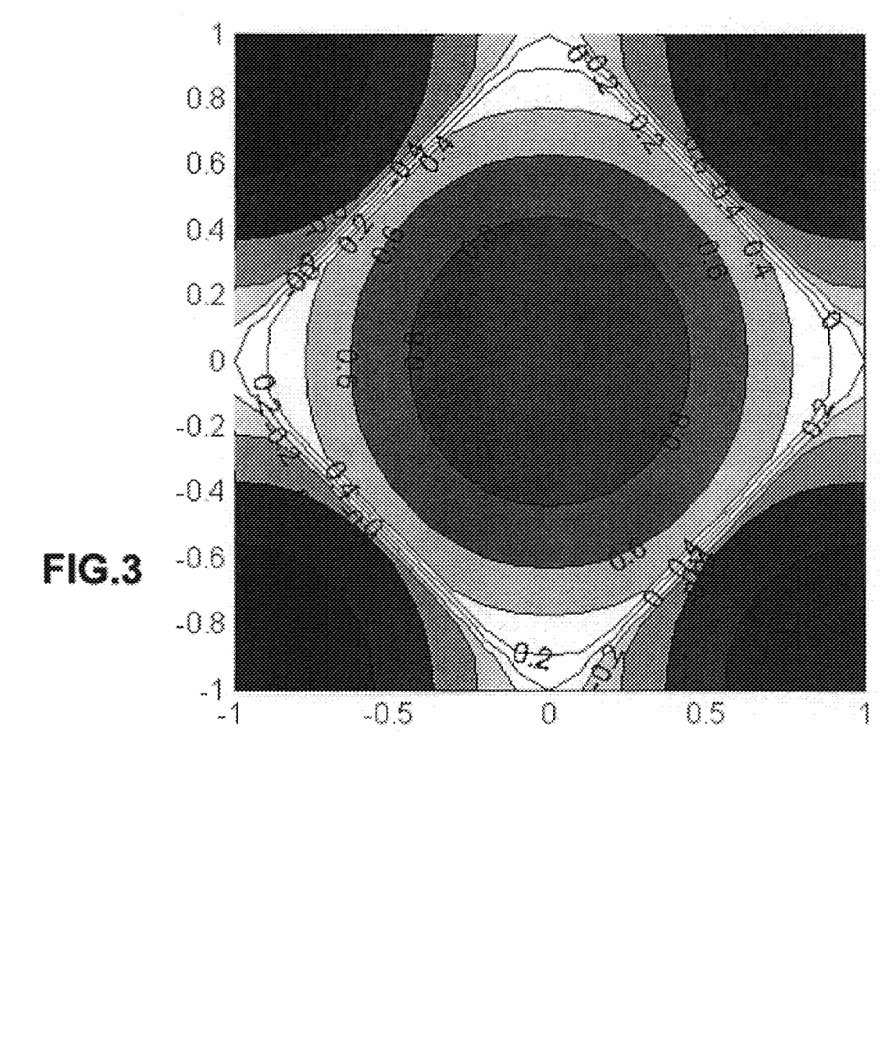
FIG. 3 illustrates a spot function in accordance with an exemplary embodiment of the present invention.

One exemplary spot function is illustrated by FIG. 3. The spot function includes values (representing the order of pixel darkness) that range from −1 to 1 that vary depending upon position.

The selected spot function is then overlaid upon a halftone cell within the halftone matrix to thereby provide a correspondence between the position of each pixel within each halftone cell and values provided by the spot function.

Figure 4:
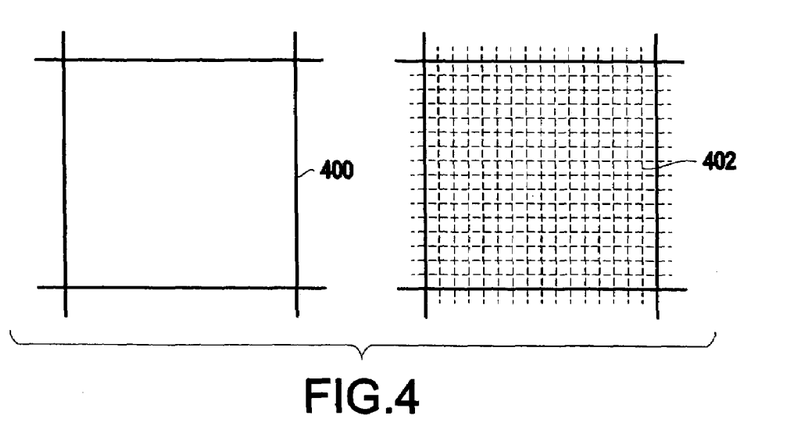
FIG. 4 illustrates a pixel grid 400 subdivided into sub-pixels 402 in accordance with an exemplary embodiment of the present invention.

An exemplary embodiment of the present invention, then divides each pixel in the halftone cell into sub-pixels. One example of a pixel 400 that has been subdivided into sub-pixels 402 is illustrated by FIG. 4. In this example, the pixel 400 has been subdivided exemplarily into 256 sub-pixels 402. 256 sub-pixels are appropriate for an eight (8) bit system. More sub-divisions may be used to obtain increased bit depth.

The pixel 400 is sub-divided into sub-pixels sufficient for the bit depth of the continuous tone image system. 256 sub-pixels are sufficient for an eight (8) bit per pixel continuous tone image system while 256×256 sub-pixels may be used for a sixteen (16) bit continuous tone image system. It generally is desirable to have more sub-pixels than is required based on the printer bit depth requirement to allow the results to be quantized to the best exposure value.

Next, the value of the spot function at each sub-pixel position is obtained by calculating the spot function value for the center of each sub-pixel in the mask. The spot function calculations are done for all the sub-pixels in the whole halftone mask area.

In an exemplary embodiment of the present invention, all sub-pixels of the mask are ranked in order by spot function value that represents the order of pixels turning black.

Figure 5:
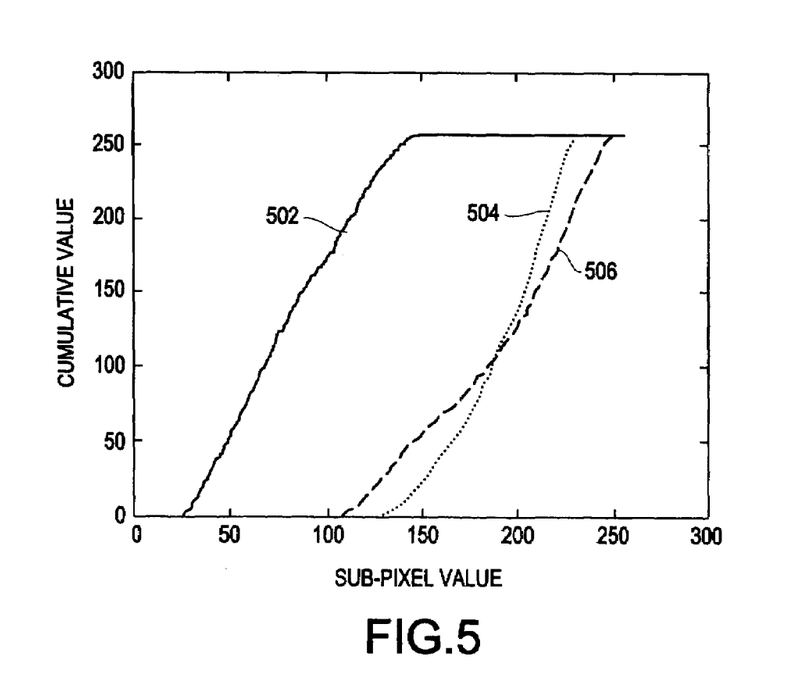
FIG. 5 illustrates three cumulative histograms 502, 504, and 506 in accordance with an exemplary embodiment of the present invention.

Next, the order numbers are normalized and made integers that range between 0 and 255 (for an eight (8) bit continuous tone image system). The 256 entry table for each pixel of the halftone mask is constructed by generating a cumulative histogram of the sub-pixels for each pixel. This step is performed for the entire halftone matrix. For a M×N size halftone mask, M×N tables, each having 256 entries, are created FIG. 5 illustrates cumulative histograms 502, 504, and 506, which are based upon the integers stored in the corresponding tables for each of three different pixels within a halftone cell.

Figure 6A:
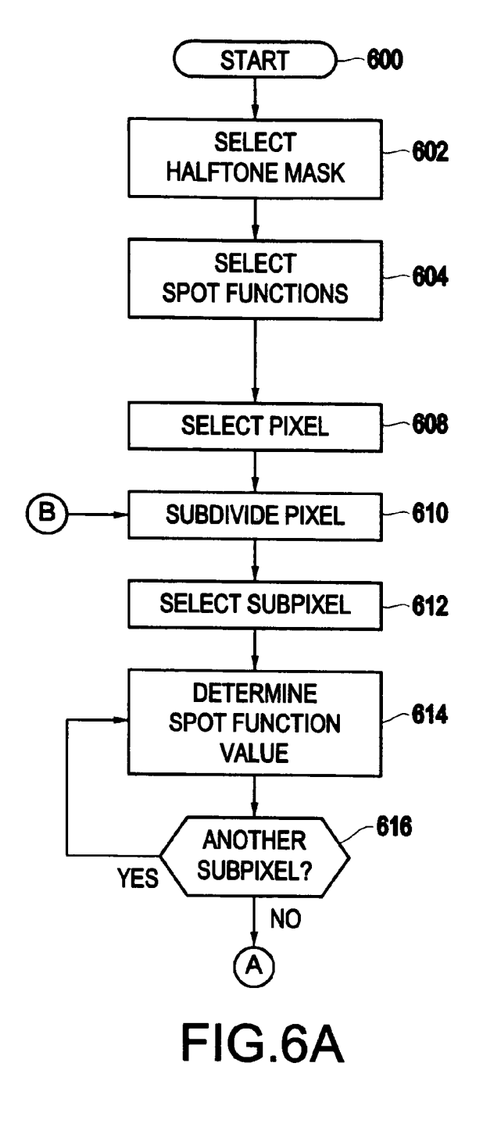
FIGS. 6A and 6B illustrate a method for creating halftone tables in accordance with an exemplary embodiment of the present invention.
Figure 6B:
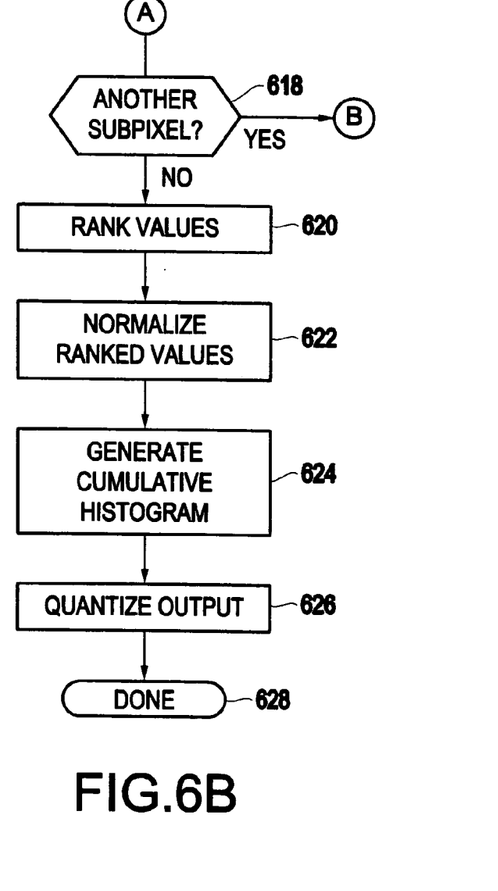

Since there are 256 sub-pixels for each pixel, all of the cumulative histograms 502, 504, and 506 reach the value 256, but the shape of each of the cumulative histograms 502, 504, and 506 depend upon the distribution of sub-pixel values FIGS. 6A and 6B illustrate a flowchart for creating halftone tables in accordance with an exemplary embodiment of the present invention. The flowchart starts at step 600 and continues to step 602 where a halftone mask is selected. As explained above, the present invention may be applied to any halftone mask. The selection of an appropriate halftone mask may depend upon printer resolution, halftone screen resolution and halftone screen angle.

After the halftone mask is selected in step 602, the method continues to step 604 where an appropriate spot function is selected.

In step 608, the method selects a pixel within the halftone cell. In step 610, the method subdivides the pixel into sub-pixels.

In step 612, the method selects one of the sub-pixels. In step 614, the method determines the spot function value in accordance with the position of the sub-pixel within the halftone cell.

In step 616, the method determines if there is another sub-pixel within the current pixel. If, in step 616, the method determines that there is another sub-pixel within the current pixel (e.g., a "YES"), then the method returns to step 614. If, however, in step 616, the method determines that there are no more sub-pixels within the current pixel (e.g., a "NO").

In step 618, the method determines if there is another pixel within the halftone mask.

If, in step 618, the method determines that there is another pixel within the halftone cell (e.g., a "YES"), then the method returns to step 610. If, however, in step 618, the method determines that there are no more pixels within the halftone cell (e.g., a "NO"), then the method continues to step 620.

In step 620, the method ranks the spot function value for the entire halftone matrix (or mask) in an order corresponding to an increase in the values that was determined using the spot function.

In step 622, the method normalizes the ranked values such that the normalized values are integers between 0 and 255.

In step 624, the method creates a halftone table by generating a cumulative histogram based upon the normalized values and the method continues to step 626.

In step 626, the method quantizes the output values of each halftone table based upon printer output capability. The method then terminates at step 628.

The 256 entry table for each pixel of the halftone mask is constructed by generating a cumulative histogram of the normalized order number of the sub-pixels for each pixel. This step is performed for each pixel within the halftone mask. For a M×N size halftone mask, M×N tables, each having 256 entries, are created.

Once an exemplary embodiment of the present invention has created the halftone tables, those tables may then be adapted for use with a particular device. For example, the halftone tables may be further modified for use with a printer that may only be capable of printing a number of gray levels that is less than 256 levels. For a 4 bit printer, the output of each table needs to be quantized into 16 levels.

In an exemplary embodiment of the present invention, the halftone tables may be modified for use with a printer that is only capable of printing N gray levels. This modification quantizes the values in the tables to the printer's N gray levels.

Figure 7:
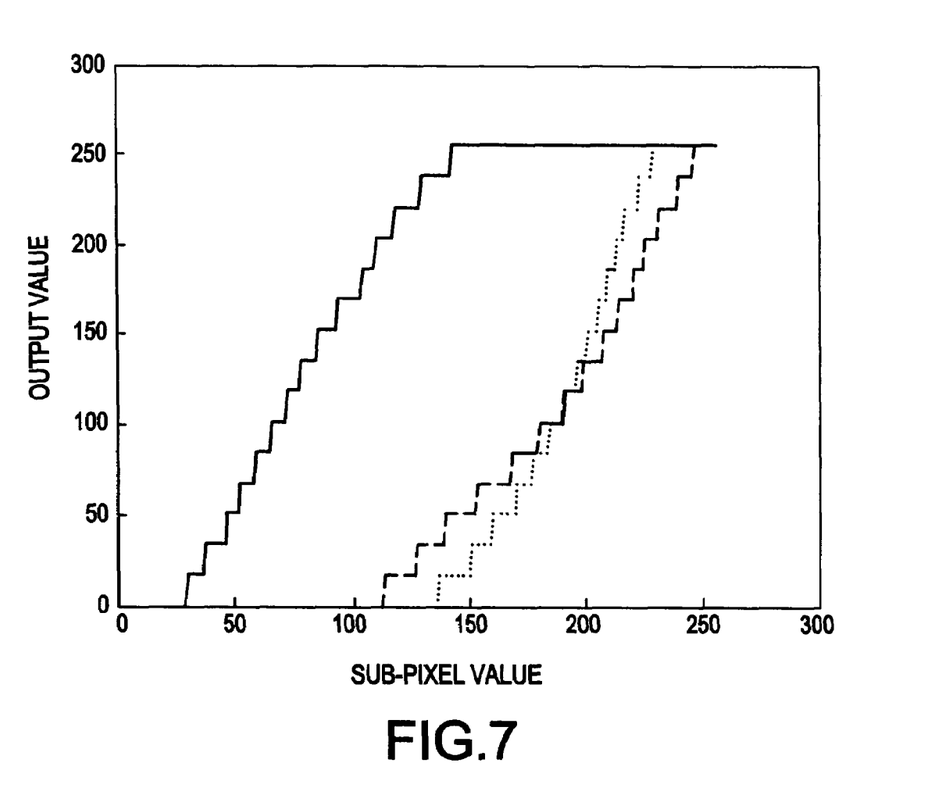
FIG. 7 illustrates three quantized cumulative histograms 702, 704, and 706 in accordance with the cumulative histograms 502, 504, and 506 of FIG. 5.

FIG. 7 illustrates quantized versions of three cumulative histograms 702, 704, and 706 that correspond to the cumulative histograms 502, 504, and 506, respectively, in FIG. 5. In this instance, N=16 gray levels. The quantized histogram for each pixel in the mask is then saved as a 256 entry table for that mask position.

Figure 8A:
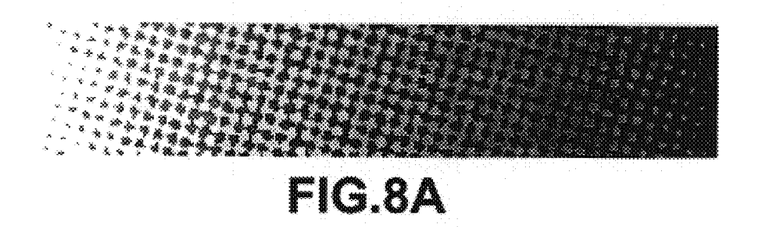
FIGS. 8A-8C illustrate the results of three halftoning methods applied to a gray wedge.
Figure 8B:
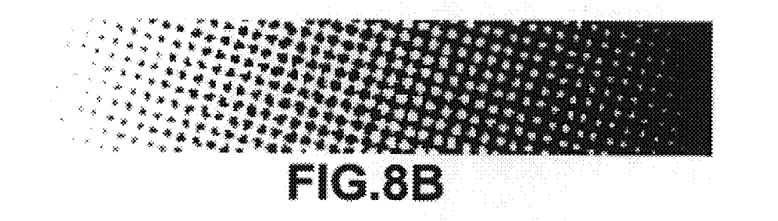
Figure 8C:
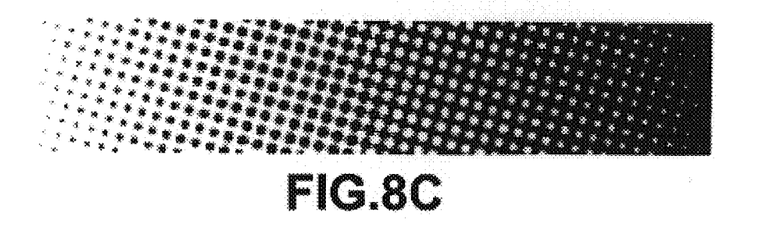

FIGS. 8A-8C illustrate the results of three halftoning methods applied to a gray wedge having 16 gray levels. The outputs are enlarged to show detail and the screen angle and resolution for the halftoning methods were chosen to exaggerate the misalignment of dot centers and pixels. The output of FIGS. 8A and 8B were generated using other multi-bit halftone methods developed by International Business Machines. FIG. 8A shows a multi-bit halftone method that avoids smooth textures for intermediate levels (as disclosed by co-pending patent application, International Business Machines docket number YOR920040668US1, and filed on Apr. 29, 2005). FIG. 8B shows the Gray-on-Edge multi-bit halftone method (as disclosed in U.S. Pat. No. 6,714,318 entitled "Dithering method and apparatus for multitone printer").

The output illustrated by FIG. 8C was obtained using an exemplary embodiment of the invention. The output shown in FIG. 8C shows the smoothest and most consistent dots growth of the three with consistent dot size and shape. Thus, the output of FIG. 8C is the highest quality halftone image.

Figure 9:
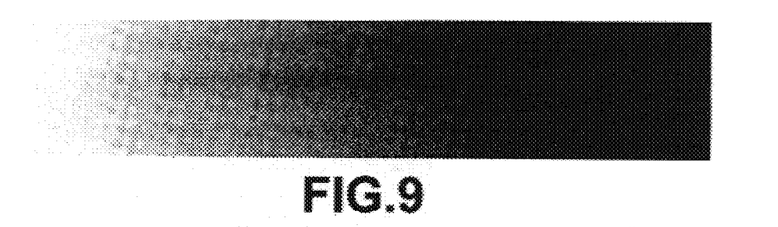
FIG. 9 illustrates the results of another type of halftone mask in accordance with an exemplary embodiment of the present invention.

Additional methods exist to design multi-level halftone masks. These halftone masks are often referred to as multi-tonal or multi-bit halftone masks. Some techniques, such as those implemented by Adobe® in their raster image processors, create uniform exposure tints at some gray levels. At these uniform exposure tint levels no spatial contrast exists, therefore, they do not print well using common printer technologies such as Electro-photography. An example of this type of halftone is illustrated by FIG. 9. This example is also enlarged to show detail and uses 16 gray levels.

Improvements are possible such the gray-on-edges methods (referenced above), which was used to obtain the results illustrated by FIG. 8B. While this method provides more contrast than the Adobe® method the gray-on-edges method creates halftones that are similar to binary halftones and do not provide the quality that is possible using an exemplary embodiment of the present invention. This is because the basis for the halftone is a threshold array similar to the method used with binary screening.

Figure 10:
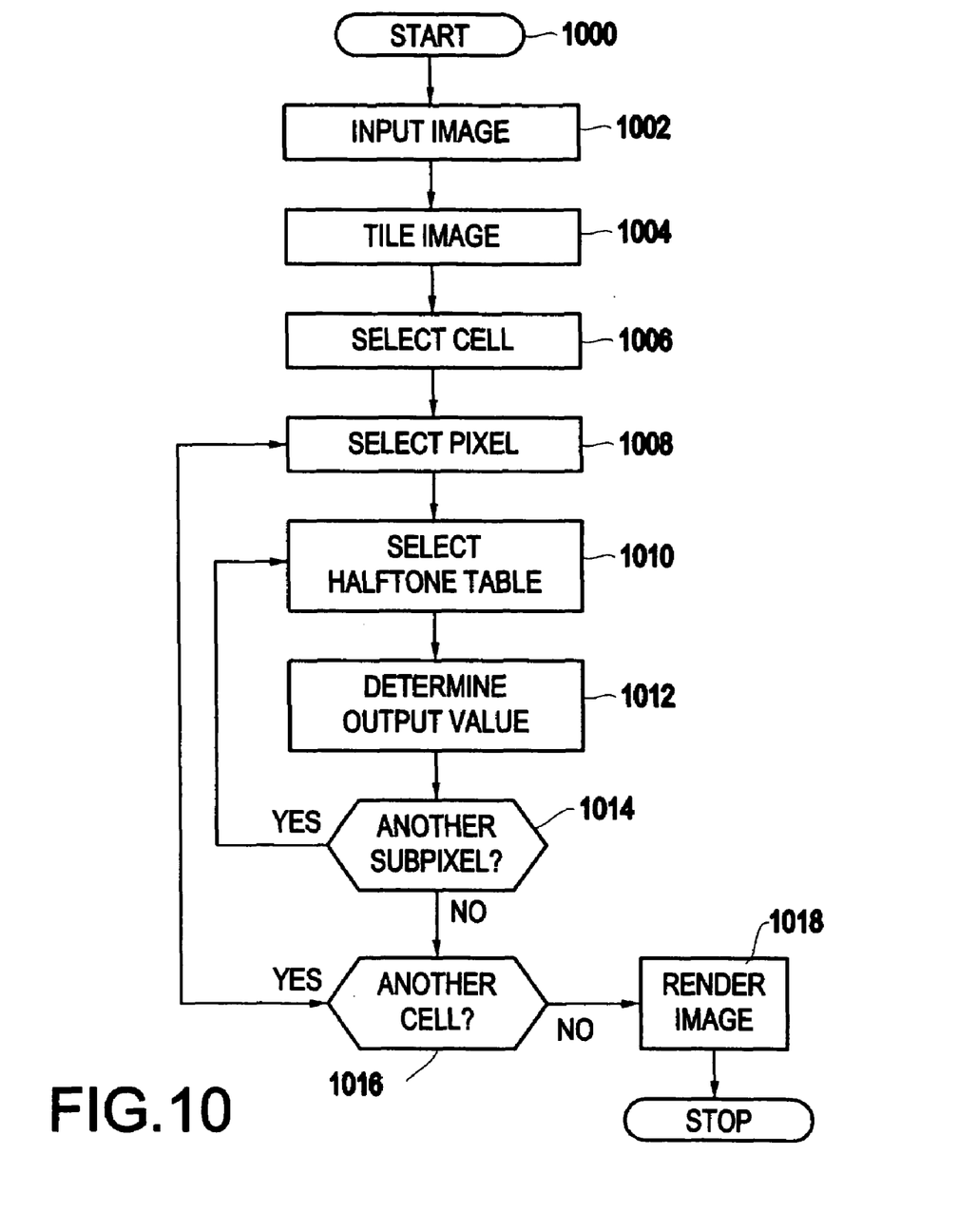
FIG. 10 illustrates an exemplary method for halftoning an image in accordance with an exemplary embodiment of the present invention.

FIG. 10 illustrates an exemplary method for rendering an image using the halftone tables that use a spot function in accordance with an exemplary embodiment of the present invention.

The method starts at step 1000 and continues to step 1002. In step 1002, the method inputs an image and continues to step 1004. In step 1004, the method tiles the image with the halftone mask and continues to step 1006. In step 1006, the method selects a cell within the tiled image.

In step 1008, the method selects a pixel within the selected cell. In step 1010, the method selects a halftone table that corresponds to the position of the current pixel within the halftone cell.

In step 1012, the method determines an output value for the current pixel by "looking-up" the value in the halftone table using the pixel gray value as index.

In step 1014, the method determines if there is another pixel within the current halftone cell. If, in step 1014, the method determines that there is another pixel within the current halftone cell (e.g., a "YES"), then the method returns to step 1010.

If, however, in step 1014, the method determines that there is not another pixel within the halftone cell (e.g., a "NO"), then the method continues to step 1016.

In step 1016, the method determines whether there is another cell within the tiled image. If, in step 1016, the method determines that there is another cell within the tiled image, then the method returns to step 1008.

If, however, in step 1016, the method determines that there is not another cell within the tiled image, then the method continues to step 1018, where the method renders the output image.

The method then terminates at step 1020.

Figure 11:
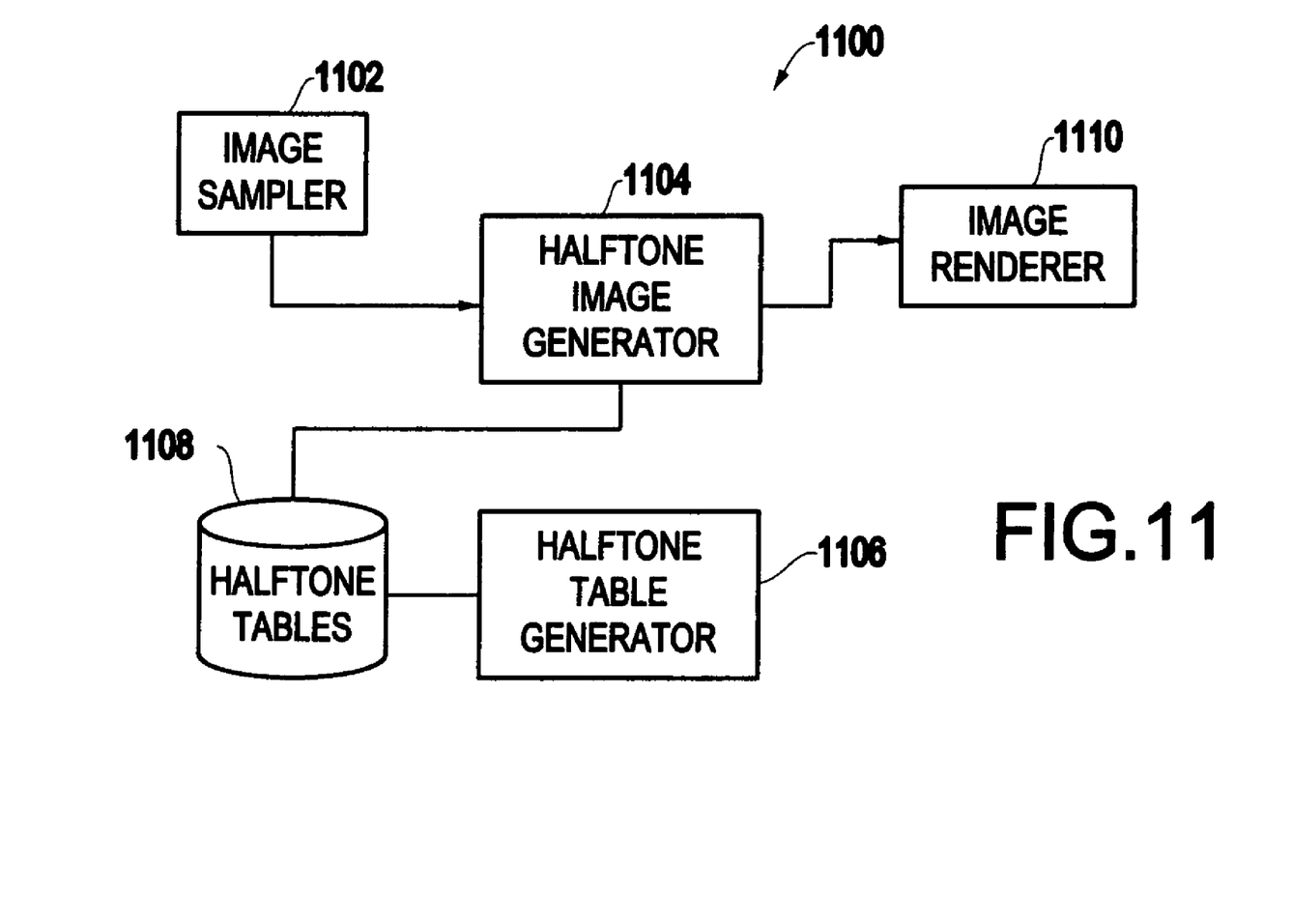
FIG. 11 illustrates an exemplary halftoning system 1100 in accordance with an exemplary embodiment of the present invention.

FIG. 11 illustrates an exemplary embodiment of a system 1100 for halftoning an image in accordance with the present invention. The system 1100 includes an image sampler 1102, such as an image scanner or other source for an input image. The system 1100 also includes a halftone image generator 1104 in communication with the image sampler 1102 for receiving an input image, a halftone table database 1108 for obtaining halftone tables and an image renderer 1110 for outputting the halftone image to be rendered. The halftone table database 1108 includes halftone tables that were generated using a spot function by a halftone table generator 1106 in accordance with the present invention.

The image sampler 1102 provides an input image to the halftone image generator 1104. The halftone image generator 1104 generates a halftone image using the halftone tables from the halftone table database 1108 and the input image from the image sampler 1102. The halftone image generator 1104 then provides the generated halftone image to the image renderer 1110 such as, for example, a printer or display The exemplary halftone table generator 1106 is detailed by FIG. 12. The halftone table generator 1106 includes a halftone mask generator 1202, a pixel sub-divider 1206, a spot function selector 1204, a spot function value determining unit 1208, a value ranking device 1210, an order number assigning device 1212, a normalizer 1214, a cumulative histogram generator 1216, and a quantizer 1218.

Figures 12, 13:
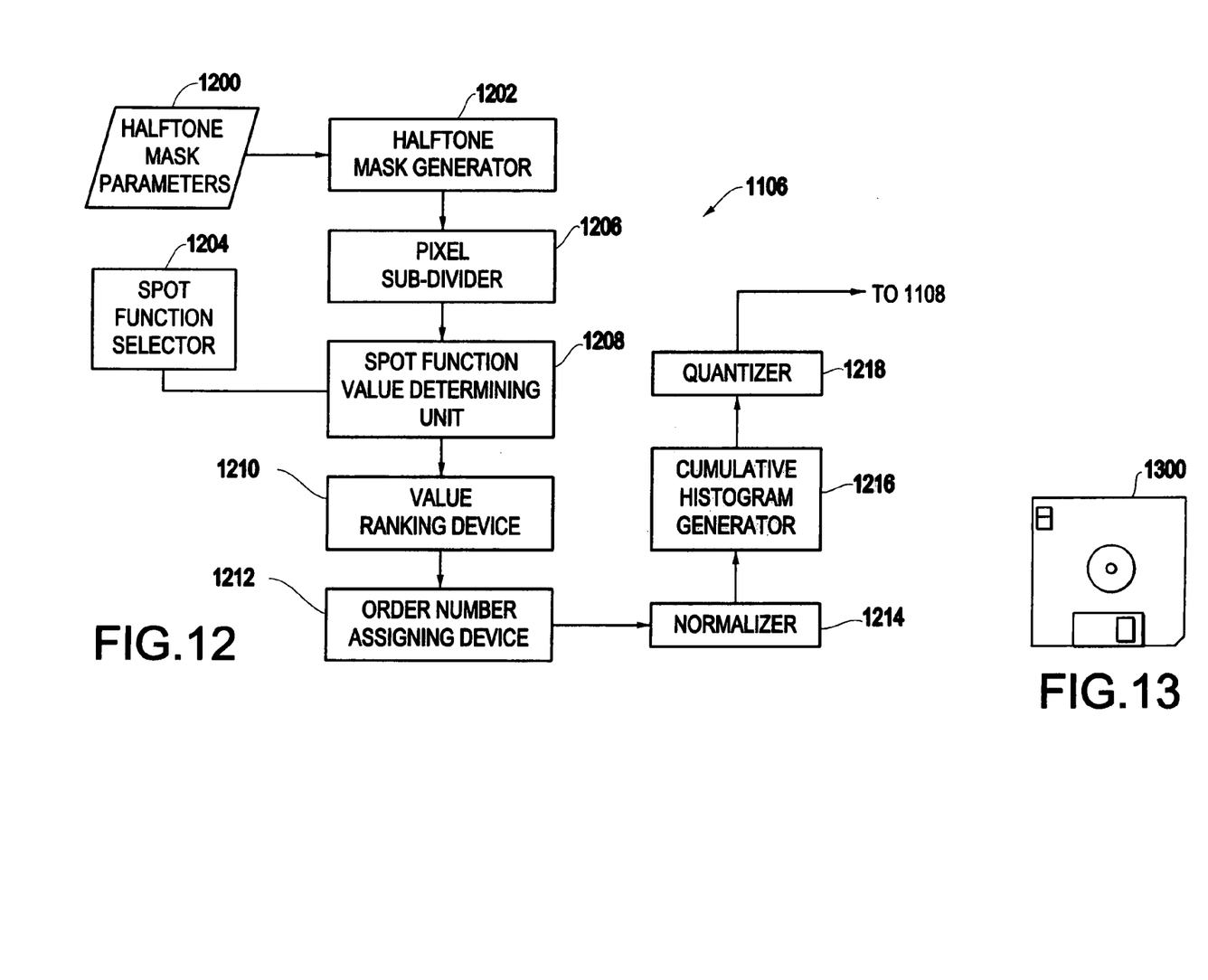
FIG. 12 illustrates an exemplary halftone table generator 1106 for the exemplary halftoning system 1100 of FIG. 11.
FIG. 13 illustrates a signal bearing medium 1300 (e.g., storage medium) for storing steps of a program of a method according to the present invention.

The halftone mask generator 1202 generates or selects a halftone mask using halftone mask parameters 1200 based upon the factors discussed above. The pixel sub-divider 1206 receives the generated halftone mask from the halftone mask generator 1202 and divides the pixels within the halftone mask into sub-pixels.

The spot function selector 1204 selects a spot function based upon the factors discussed above. The spot function value determining unit 1208 correlates the positions in the spot function that was selected by the spot function selector 1204 to the positions of the sub-pixels and determines the value for all sub-pixels for all pixels within the halftone cell.

The value ranking device 1210 ranks the values of all of the sub-pixels within the halftone mask (or matrix). The order number assigning device 1212 assigns order numbers to each sub-pixel based upon the ranking performed by the value ranking device 1210. The normalizer 1214 normalizes the order numbers provided by the order number assigning device 1212. A cumulative histogram generator 1216 generates a cumulative histogram of the normalized order number. The quantizer 1218 quantizes the cumulative histogram to correspond to the number of available gray rendering levels for a particular image rendering device, such as a printer.

An exemplary embodiment of the present invention uses the multi-level capability of printers to give the appearance of each halftone dot being centered exactly on the coordinates of the halftone screen grid.

Further, in accordance with an exemplary embodiment of the present invention, the growth of each dot is determined by an analog spot function. In this manner, the resulting halftone appears smooth and less noisy or grainy than has conventionally been obtainable.

In addition, the halftone images that are generated by an exemplary embodiment of the present invention are easily printed by electro-graphic printers because these printers employ the traditional dots-on-a-grid structure that has historically been used by these printers.

With an exemplary embodiment of the present invention, halftone screens of almost any frequency and angle are possible. Further, these halftone screens have uniformly shaped screen dots because an exemplary embodiment of the present invention eliminates the constraint that screen dot locations have to be located on the pixel locations defined by the printer grid.

With an exemplary embodiment of the present invention, the halftone screen dots can be located precisely on a halftone screen grid without quantization effects, depending on the number of device exposure levels available.

Increasing the number of exposure levels (bits/spot) reduces the amount of artifacts and improves the ability to form uniform screen dots.

Increasing the number of bits/spot also provides additional halftone gray levels which further improves smoothness and reduces noise.

Dividing the pixels into sub-pixels allows the present invention to be used with any halftone mask and improves the smoothness of the resulting output image over methods and systems that do not rely upon the present invention.

Further, dividing the pixels into sub-pixels enables the halftone mask to characterize the spot function better than those methods and systems that do not divide the pixels.

There are many multilevel printer technologies in existence and each technology has its own unique capabilities and restrictions. In general, the halftoning scheme that is used is dependent on the printer technology and a comparison of halftoning methods used on different types of printers is not meaningful. Therefore, comparisons must be made between halftoning methods designed for the same printer technology. An exemplary embodiment of the present invention is intended for electro-graphic printers that require halftones using dot clusters having at least some level of contrast in comparison to the surroundings.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method comprising:
   subdividing at least one pixel within at least one halftone cell of a halftone matrix into a plurality of sub-pixels;
   determining the value of the spot function corresponding to the position of each sub-pixel of the plurality of sub-pixels within the halftone matrix;
   repeating the subdividing and determining the value of the spot function for all pixels within the halftone matrix;
   ranking the values of the spot function for the entire halftone matrix;
   normalizing each ranked value to an integer;
   generating a cumulative histogram of the sub-pixels based upon the normalized values; and
   storing the cumulative histogram as a halftone table.

2. The method of claim 1, wherein said ranking the spot function values of sub-pixels further comprises assigning an order number to each sub-pixel within the halftone matrix.

3. The method of claim 1, further comprising quantizing output values from said halftone table.

4. The method of claim 3, wherein said quantizing is based upon a number of available output levels.

5. A method comprising:
   tiling an image using a halftone matrix; and
   determining an output value for each pixel of said image using a plurality of halftone tables each corresponding to a pixel position within a halftone cell of the halftone matrix, wherein at least one of the plurality of halftone tables is based upon a cumulative histogram that is based upon values of a spot function applied to all sub-pixels of each pixel in the halftone matrix.

6. The method of claim 5, further comprising quantizing output values from said halftone table.

7. The method of claim 6, wherein said cumulative histogram is based upon normalized spot function values for said sub-pixels.

8. The method of claim 7, wherein said normalized spot function values are based upon ranked spot function values for the sub-pixels for the entire halftone matrix.

9. A system comprising:
   means for subdividing at least one pixel within at least one halftone cell of a halftone matrix into a plurality of sub-pixels;
   means for determining the value of the spot function corresponding to the position of all of the plurality of sub-pixels within the halftone matrix;
   means for ranking the spot function values;
   means for normalizing each ranked value to an integer;
   means for generating a cumulative histogram of the sub-pixels of the normalized values; and
   means for storing the cumulative histogram as a halftone table.

10. The system of claim 9, further comprising means for quantizing an output from the halftone table.

11. The system of claim 10, wherein said quantizing is based upon a number of available output levels.

12. The system of claim 9, wherein said means for ranking comprising means for assigning an order number to each sub-pixel within the halftone matrix.

13. A method for deploying computing infrastructure for performing the method of claim 1, comprising integrating computer-readable code into a computing system, the computer-readable code comprising:
   instructions for subdividing at least one pixel within at least one halftone cell of a halftone matrix into a plurality of sub-pixels;
   instructions for determining the value of the spot function corresponding to the position of each sub-pixel of the plurality of sub-pixels within the halftone matrix;
   instructions for repeating the subdividing and determining the value of the spot function for all pixels within the halftone matrix;
   instructions for ranking the values of the spot function for the entire halftone matrix;
   instructions for normalizing each ranked value to an integer between 0-255;
   instructions for generating a cumulative histogram based upon the normalized values; and
   instructions for storing the cumulative histogram as a halftone table.

14. The method of claim 13, further comprising instructions for quantizing an output from said halftone table.

15. The method of claim 14, wherein said quantizing is based upon a number of available output levels.

16. The method of claim 13, wherein said instructions for ranking comprise instructions for assigning an order number to each sub-pixel within the halftone matrix.

17. A system for generating a halftone table using a spot function in accordance with claim 1, the system comprising:
   a sub-divider that subdivides at least one pixel within at least one halftone cell of a halftone matrix into a plurality of sub-pixels;
   a processor that determines the value of the spot function corresponding to the position of each the plurality of sub-pixels within the halftone cell, wherein said sub-divider and said processor sub-divide and process all pixels within the halftone matrix;
   a ranking device that ranks the values of the spot functions for the entire halftone matrix;
   a normalizing device that normalizes the ranked values;
   a generator that generates a cumulative histogram based upon the normalized values; and storage for storing the cumulative histogram as a halftone table.

18. The system of claim 17, further comprising a quantizer that quantizes an output from the halftone table.

19. The system of claim 18, wherein said quantizer quantizes said output based upon a number of available output levels.

20. The system of claim 13, wherein said ranking device further comprising an order number assigning device that assigns an order number to each sub-pixel within the entire halftone matrix.

* * * * *